June 16, 1953

T. GRETHER 2,641,888

BEAN HARVESTER

Filed Nov. 14, 1949

TOBIAS GRETHER,
INVENTOR.

BY Hazard & Miller

ATTORNEYS

June 16, 1953 T. GRETHER 2,641,888
BEAN HARVESTER
Filed Nov. 14, 1949 6 Sheets-Sheet 3

TOBIAS GRETHER,
INVENTOR.

BY Hazard & Miller
ATTORNEYS

June 16, 1953 — T. GRETHER — 2,641,888
BEAN HARVESTER
Filed Nov. 14, 1949 — 6 Sheets-Sheet 4

TOBIAS GRETHER,
INVENTOR.

BY Hazard & Miller
ATTORNEYS

TOBIAS GRETHER, INVENTOR.

BY Hazard & Miller ATTORNEYS

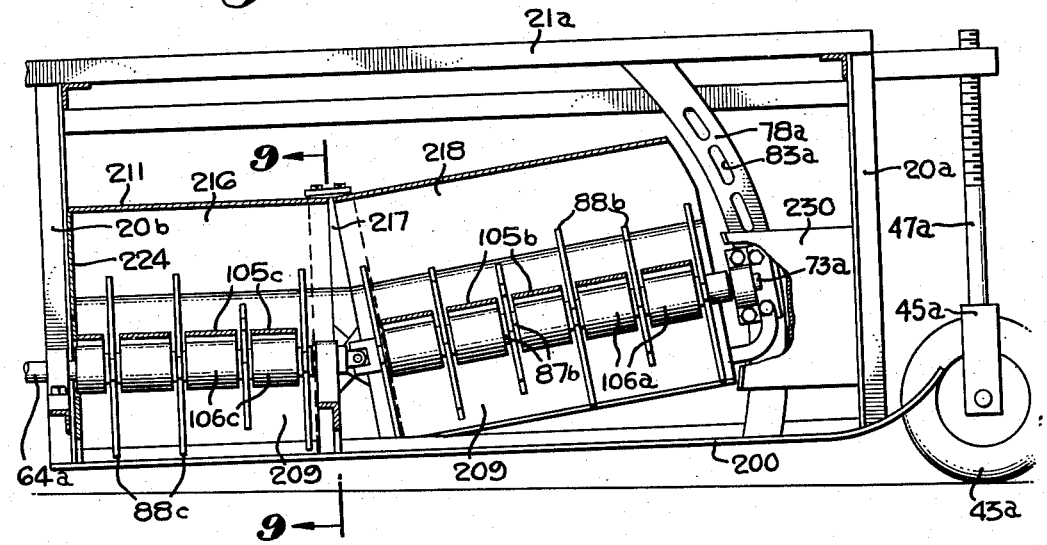

Patented June 16, 1953

2,641,888

UNITED STATES PATENT OFFICE 2,641,888

BEAN HARVESTER

Tobias Grether, Camarillo, Calif., assignor of one-fourth to Ventura Farms Frozen Foods, Incorporated, Oxnard, Calif., a corporation of California Application November 14, 1949, Serial No. 127,097

16 Claims. (Cl. 56—19)

This invention relates to pickers and in particular to bean pickers and methods for picking beans or bean pods.

A present method of picking beans comprises cutting the whole stalks off, gathering the beanstalks and transporting them to a station where the stalks and the bean pods can be separated. This method is expensive in that it requires that the stalks which are not used be cut and transported, and this method also requires the additional step of separating the stalks from the pods. Another method of picking bean pods comprises picking the pods off the stalks. This method has proved unsatisfactory in general because of the loss of pods which fall to the ground during the picking operation.

A main object of the present invention is to provide a bean picker by which it is possible to pick a greater percentage of pods than heretofore possible and to pick the pods directly from the stalks and leaving the stalks in the soil. This is accomplished by providing an improved means for stripping pods from the stalks which means will leave the stalks in the soil and by providing means for sweeping the ground to pick up pods which have fallen on the ground during picking operations.

Another object of the present invention is to provide various improvements in bean pickers.

Another object of the present invention is to provide a bean picker having rotating picking units which are adjustable to strip different types of bean stalks.

Another object of the present invention is to provide a bean picker having at least two rotating picker units having fingers which have overlapping paths of travel or in which the paths of travel are interjacent.

Another object of the present invention is to provide a bean picker having rotating units of picking fingers wherein the fingers are arranged in haphazard out of line arrangement.

Another object of the present invention is to provide improved means for shielding the picking fingers of a bean picker.

Another object of the present invention is to provide means for forming the soil between ground-engaging members in a manner such as to allow the soil to be readily swept to pick up bean pods deposited on the ground.

Another object of the present invention is to provide a bean picker which sweeps the soil but is so designed as to pick up a minimum amount of dirt, stones, and the like.

Another object of the present invention is to provide a bean picker in which there is a rotating finger unit having a front adjustable part and a rear stationary part, the front part being adjustable to adapt the bean picker to various size stalks.

With the foregoing and other objects in view which will be made manifest in the following detailed description and specifically pointed out in the appended claims, reference is had to the accompanying drawings for an illustrative embodiment of the invention, wherein:

Fig. 8 is a side view in elevation of a modified form of the invention; and

Fig. 9 is a sectional view along lines 9—9 of Fig. 8.

Figure 1:
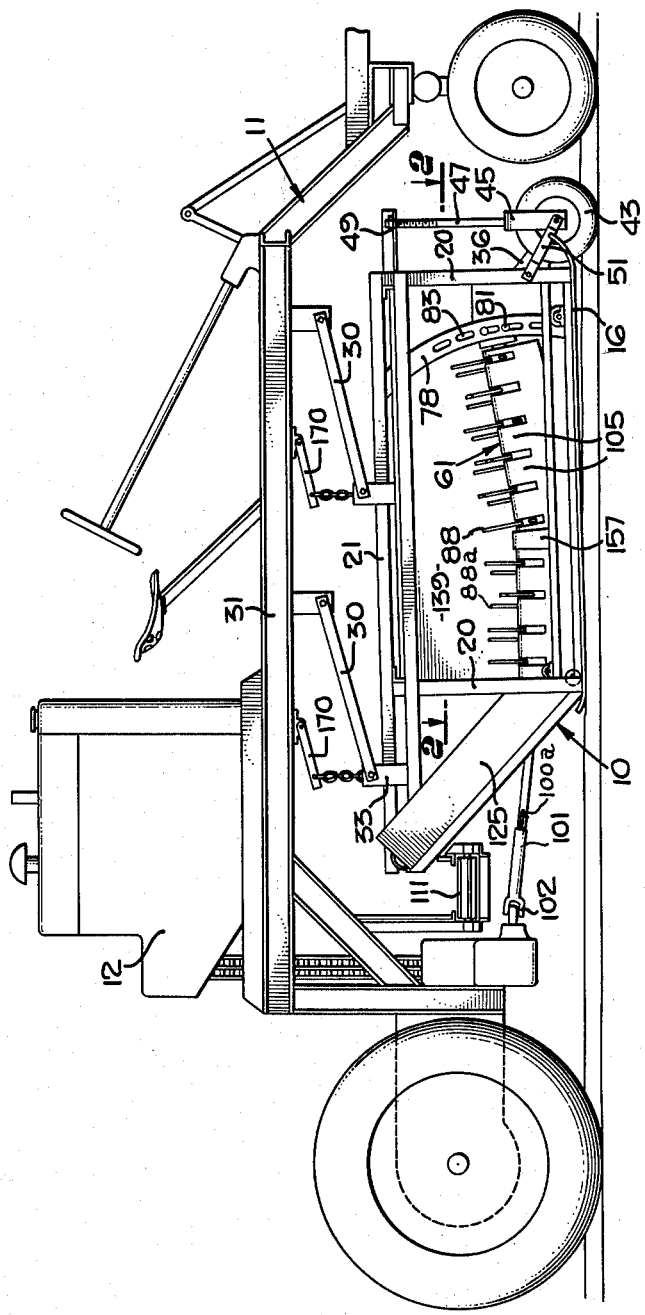
Figure 1 is a side view in elevation of the bean picker of the present invention and associated apparatus.

Referring to the accompanying drawings wherein similar reference characters designate similar parts throughout, Fig. 1 shows a bean picker embodying the concepts of the present invention and designated generally by the reference numerals 10, said bean picker being drawn by a motor-driven wheeled vehicle 11 of any suitable construction, said wheeled vehicle 11 having a motor 12 for driving the wheeled vehicle and also driving various portions of the bean picker 10.

The bean picker 10 has a frame comprising ground-engaging members 15 and 16 having vertical posts 20 which support longitudinal angle members 21, there being cross angle members 22, the various angle members and posts being suitably welded or otherwise connected together to form a rigid frame.

Bean picker 10 is adapted to be pulled by a wheeled vehicle 11 through pull bars 30 which are attached to the frame 31 of vehicle 11 and also to posts 33 which are fixed to the frame of the bean picker. The pull bars 30 are pivoted to both the picker and the wheeled vehicle to allow the picker to rise and fall with the unevenness of the ground, thereby following the contour of the rows of beanstalks along which the bean picker is drawn by the wheeled vehicle.

Figure 2:
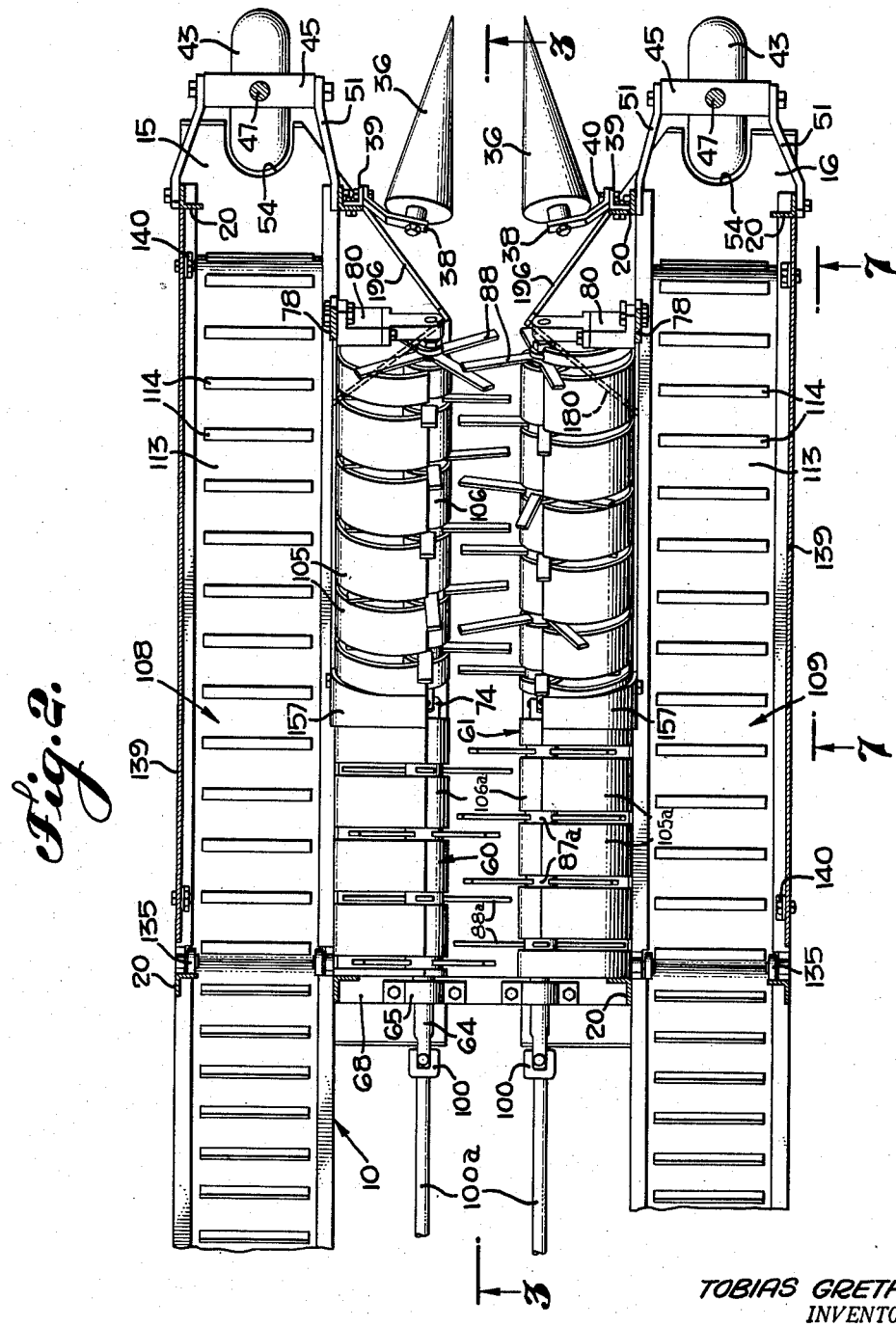
Fig. 2 is an enlarged sectional view in plan along lines 2—2 of Fig 1, showing the bean picker with the top cover screen removed.
Figure 3:
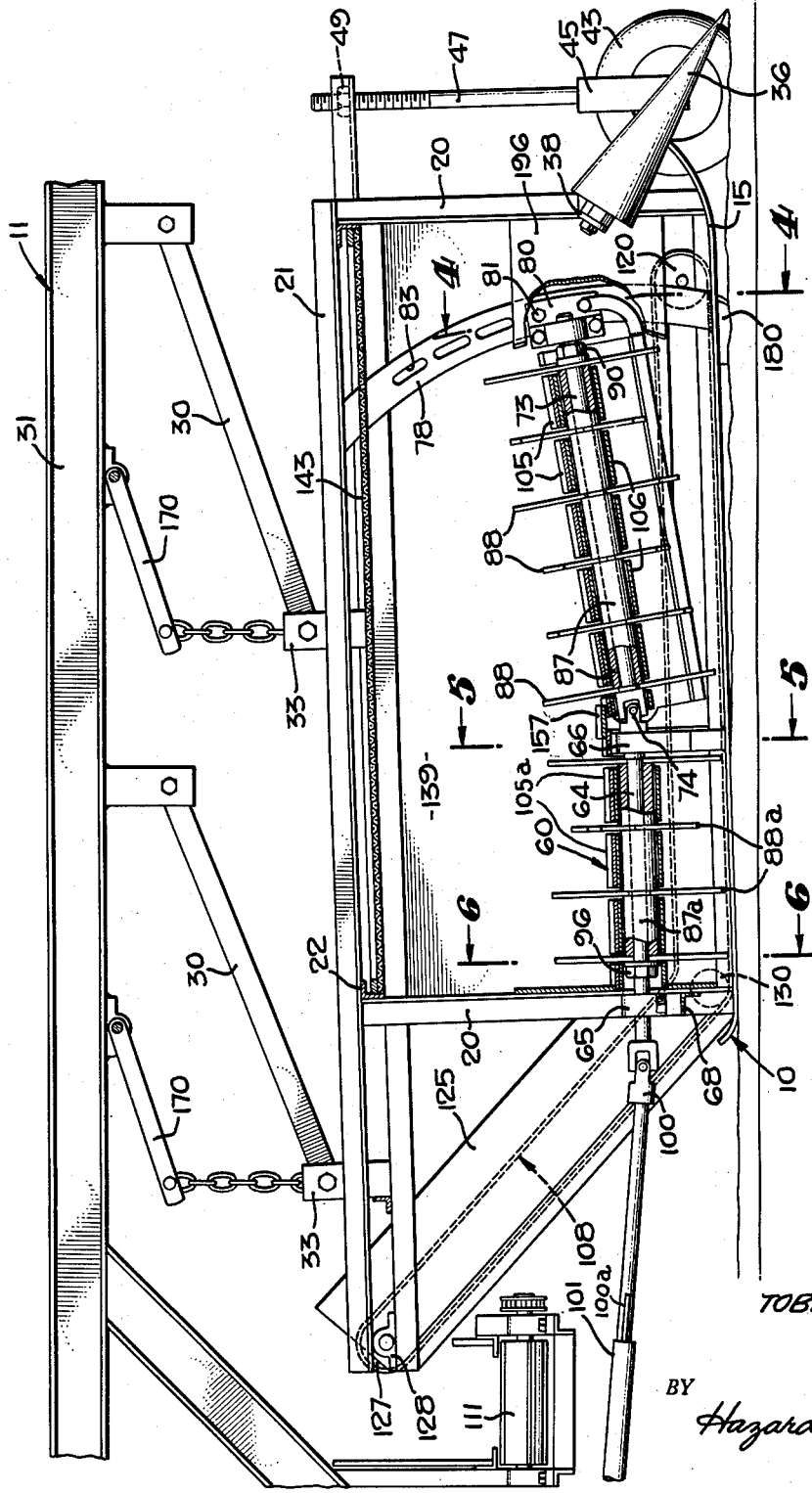
Fig. 3 is a view in side elevation in section along lines 3—3 of Fig. 2.

There are snouts 36, see Figs. 2 and 3, which are rotatably mounted on brackets 38, said brackets being adjustably mounted on posts 20 by means of sub-brackets 39 and nuts and bolts 40. By loosening the nuts and bolts 40 the bracket 38 can be rotated to raise or lower the front ends of snouts 36 whenever the front end of the bean picker is raised or lowered. The snouts 36 serve to move along the rows of beanstalks and lift up the stalks lying close to the ground so that all the bean pods may be picked by the picker. Since the snouts 36 are rotatably mounted they will rotate whenever the stalks tend to entangle about the snouts 36.

The front end of picker 10 is supported by wheels 43, said wheels being attached to the frame of the bean picker by clevises 45 having threaded rods 47 extending upwardly therefrom, there being a nut 49 for each rod, only one being shown, for adjustably fastening the threaded rods 47 to longitudinal frame members 21 of the frame of the bean picker, compare Figs. 1 and 3. There are side braces 51 for each of the wheels, said side braces being pivotally connected to front posts 20, see Fig. 2, and serve in conjunction with threaded rods 47 to mount the wheels 43 on the frame of the bean picker. The front end of the bean picker may be raised or lowered as desired by turning nuts 49 on threaded rods 47, side braces 51 allowing this movement because of their pivoted connections. Ground-engaging members 15 and 16 may be suitably relieved at 54, see Fig. 2, to accommodate wheels 43.

There are two longitudinal bean picking units 60 and 61, each unit comprising a plurality of picking fingers which are rotated to pick pods from the beanstalks. Since the units are identical unit 60 will be described.

Figure 5:
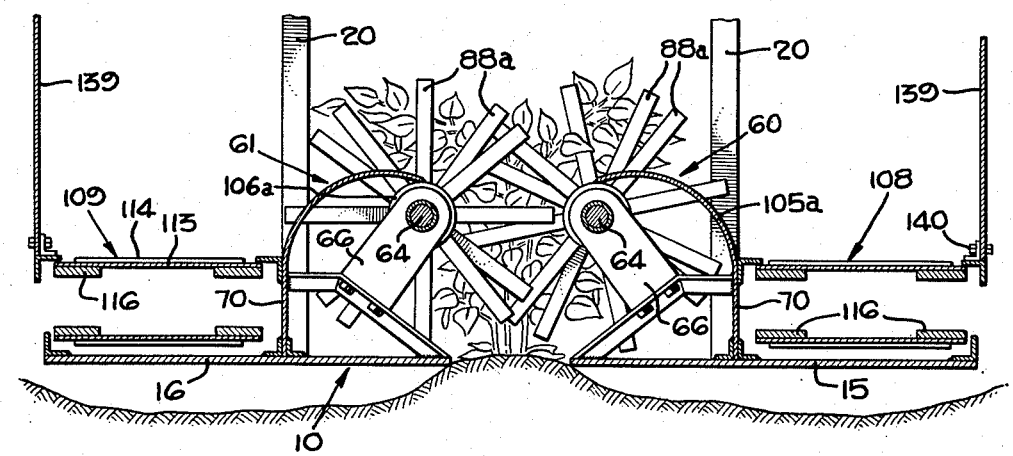
Fig. 5 is a cross-sectional view in elevation along lines 5—5 of Fig. 3.
Figure 6:
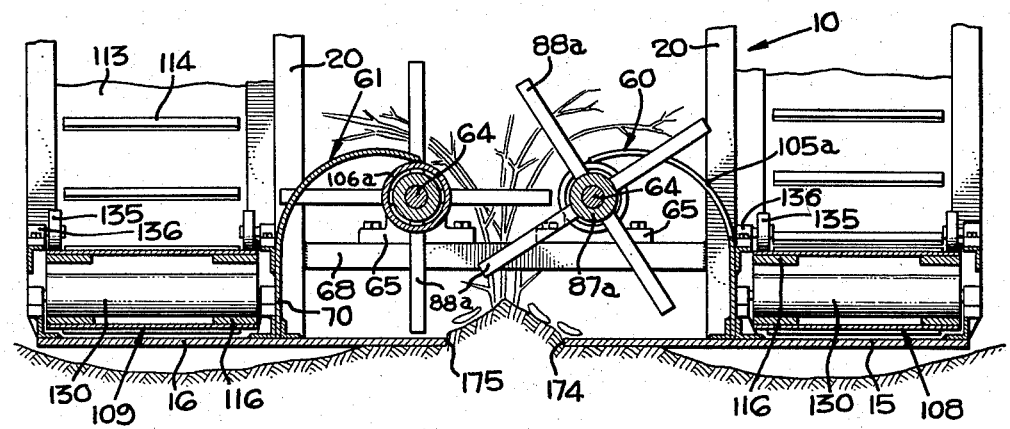
Fig. 6 is a cross-sectional view in elevation along lines 6—6 of Fig. 3.

There is a central supporting shaft 64 for each of the bean picking units, said shaft being supported from the frame of the picker by brackets 65 and 66, compare Figs. 5 and 6, bracket 65 being mounted on cross-brace 68 which is suitably fastened to post 20 and brackets 66 are mounted on ground-engaging members 15 and 16 and vertical side plates 70, which side plates are fastened in turn to ground-engaging members 15 and 16, as shown in Fig. 5. There is a forward supporting shaft 73 for each of the units 60 and 61, the forward shafts being connected to the rearward shafts by universal joints 74 so that the shafts 64 can drive shafts 73.

The forward end of shafts 73 are adjustably supported by arcuate slotted members 78 which are fastened at their lower ends to ground-engaging members 15 and 16 and at their upper ends to longitudinal angle members 21. The forward ends of shaft 73 are supported from member 78 by brackets 80 which have bearings therein, said brackets having bolts 81 which are receivable within slots 83 provided in member 78. It is obvious that bolts 81 can be removed and the forward ends of shafts 73 located at higher elevation by positioning bolts 81 in one of the upper slots.

On each of the shafts 64 and 73 there are located a plurality of bean picking subunits, each of which comprises a sleeve 87 and 87a having on one end thereof a plurality of fingers 88 and 88a which are welded or otherwise fastened to the ends of sleeves 87 and 87a. As can be seen from Fig. 3, the subunits are arranged along forward shafts 73 and abut up against universal joints 74, and these subunits are frictionally held against each other by means of nuts 90 which thread on the ends of shaft 73. The rear ends of shafts 64 are also threaded to receive nuts 96 so that the subunits on shafts 64 can be frictionally pressed against one another in a manner similar to that described for the subunits on shaft 73. Since the picking subunits are not fixedly attached to shafts 64 and 73 but are only frictionally driven, it is obvious that during picking operations the fingers 88 and 88a may rotate with respect to the driving shafts 64 and 73 whenever they encounter an obstruction such as a large rock or the like. The fingers 88 and 88a are arranged in haphazard fashion with relation to one another, that is they are arranged purposely out of alignment so that all the fingers do not engage the stalks at the same time. The fingers are designed this way in order to avoid uprooting the stalks which would occur if all the fingers contacted the stalks at the same time.

Shafts 64 are driven through universal joints 100 and splined shafts 100a and sleeves 101, the splined shafts and sleeves being driven by universal joints 102 from motor 12 by suitable chains, belt drives, or the like. There is a plurality of shields 105 and 105a for each of the longitudinal picking units 60 and 61, said shields being fastened to side plates 70 or being formed integral with side plates 70 and being fastened at their upper ends to outer sleeves 106 and 106a which are positioned around inner sleeves 87 and 87a. For sake of clarity in the drawings shields 105 and 105a have been shown as being spaced from the fingers 88 and 88a a considerable distance but actually the fingers 88 and 88a move very closely to the shields 105 and 105a so that if any vines are brought around by the fingers 88 and 88a close to the crevice between the fingers 88 and 88a and the shields 105 and 105a, these vines will be cut off. It is obvious that if the space between fingers 88 and 88a and shields 105 and 105a is very large vines could pass between the fingers and the shields and therefore cause trouble.

There are conveyor units 108 and 109 arranged along the sides of finger units 60 and 61 to convey the pods and leaves to the rear of the machine to a cross-conveyor 111, see Fig. 1, where the leaves and pods may be delivered to other suitable mechanism such as a dirt-separating device or any other suitable device as is desired.

Each of the conveyor units 108 and 109 comprises a belt 113 which has slats 114 fastened thereto transversely thereof along the length as can be seen in Fig. 2. On the edges of belt 113 are narrow belts 116 which are fastened to conveyor belt 113 and narrow belts 116 provide means, not shown, whereby the conveyor belt may be driven.

Each of the conveyor belts passes over a roller 120 at the forward end thereof, said roller being rotatably mounted on the picker frame in any suitable fashion. The conveyor belts 113 have a portion thereof rising as shown in Fig. 3, and there are side guards 125 which are fastened to the frame of the picker. There are rear rollers 127 which are rotatably mounted on the picker frame by bearings 128, see Fig. 3. Intermediate the rollers 120 and 127 are rollers 130 which are rotatably mounted on the picker frame as shown in Fig. 6, and rollers 130 serve to guide the lower portion of the conveyor belt. The upper portion of the conveyor belt is supported at the rising part thereof by rollers 135 which are rotatably mounted by bearings 136 on the picker frame, see Fig. 6. Rollers 135 do not extend across the belt since they are on the upper side thereof. As the pods and leaves are deposited on the conveyor belts 113, these pods and leaves are conveyed rearwardly and upwardly and deposited on cross-conveyor 111.

There are side guard plates 139 which are removably attached to the picker frame such as by a bracket assembly 140, see Fig. 2. There is a top screen 143 which is provided across the top of the picker unit to prevent pods from being thrown out the top of the unit. Therefore, between guards 139 and screen 143 no pods will be allowed to be thrown out of the picker unit.

Figure 7:
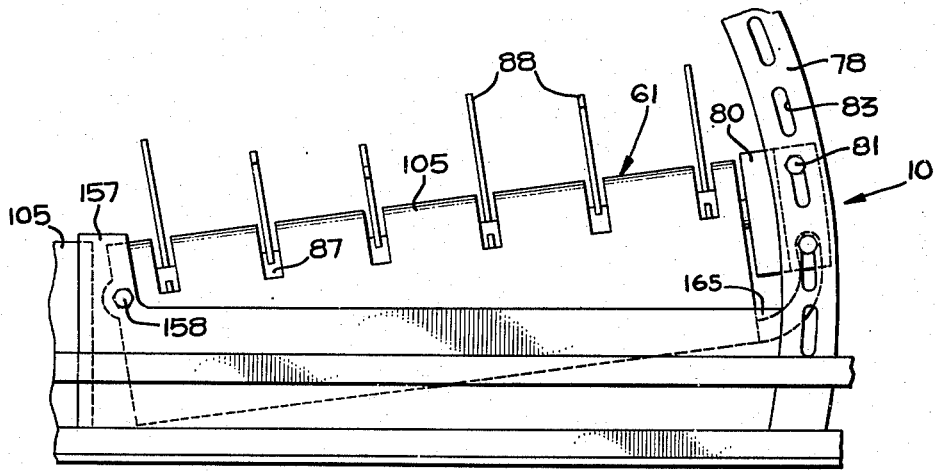
Fig. 7 is a partial side view in elevation showing the front adjustable picking unit.

As shown in Fig. 7, there is an auxiliary shield 157 which is pivoted at 158 to the forward shields 105 of the picking units 60 and 61 and these auxiliary shields 157 serve to cover the space between the forward shields 105 and the rear shields 105a at all times in any adjusted position of the forward shafts 73. The auxiliary shields 157 remain stationary as the forward shields 105 are raised with raising of the forward shafts 73. Since the forward shields 105 are raised and lowered they cannot be integral with side plates 70 as rear shields 105a can be as shown in Fig. 5; the forward shields 105 being separate from side shields 70 as can best be seen in Fig. 4. As the forward shields 105 are raised the forward portion 165 of auxiliary shields 157 serve to provide guards for the space uncovered by the forward portions of the shields 105, see Fig. 7.

Lift means 170 are provided for lifting the rear end of the picker whenever it is desired to turn at the end of a row or at any other time when it is desired.

Figure 4:
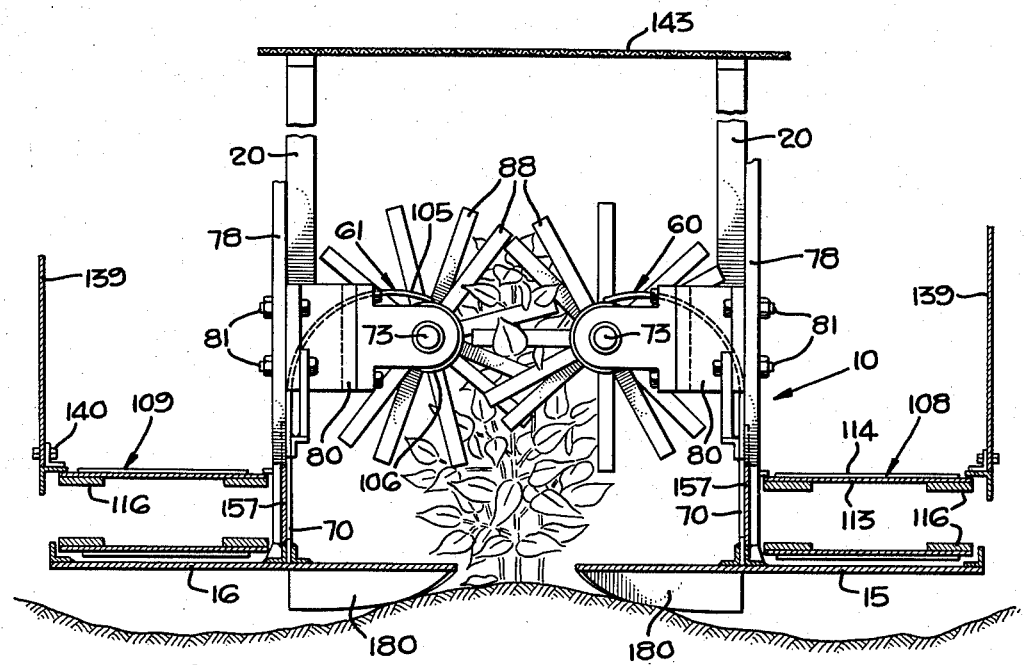
Fig. 4 is an enlarged cross-sectional view in elevation along lines 4—4 of Fig. 3.

Since only the forward end of bean picker 10 is supported by wheels 43 the rear end of picker 10 and the rear portions of ground-engaging members 15 and 16 will therefore drag or slide along the ground and the weight of the picker unit will force the ground-engaging members down into the ground as shown in Fig. 6. When this occurs the soil between the edges 174 and 175 of ground-engaging members 15 and 16 will be formed by the rotating fingers 88a into a peaked mound as shown in Fig. 6, and the bean pods which have dropped between the ground-engaging members 15 and 16 will be picked up by the fingers 88a and thrown onto the conveyors 113. It is desirable that the distance between edges 174 and 175 be kept to a minimum to avoid picking up too much dirt. It is possible to weight the picker so that the ground-engaging members 15 and 16 dig into the ground the desired amount. However, in some cases where the ground is very hard, it is desirable to provide some other means to insure that a mound may be formed and these means may comprise diggers 180, see Figs. 2 and 4. Diggers 180 are shaped as shown in Fig. 4 and positioned at an angle with relation to the line of travel of the picker 10 as best shown in Fig. 2. These diggers may be fastened to ground-engaging members 15 and 16 by any suitable means. Since these diggers are at the forward ends of the ground-engaging members 15 and 16 they will normally not dig into the ground for soil that is of the right consistency and which has not become hard. However, if hard soil is encountered the front end of the picker can be lowered by adjusting rods 47 so that the diggers 180 can dig into the ground and under such circumstances the soil adjacent the stalk roots will be removed and disturbed thereby allowing a mound to be formed.

It is important that the front ends of ground-engaging members 15 and 16 be slightly off the ground for if they are merely allowed to rest on the ground dirt crowds in front of the ground-engaging members and will prevent easy operation of the device.

The operation of the device is as follows.

The forward ends of shafts 73 which support the forward fingers 88 are adjusted along curved member 78 to that position at which the forward fingers will engage the tops of the stalks which are to be picked. The height to which the forward ends of shafts 73 are positioned depends, of course, upon what adjustment the forward ends of the ground-engaging members 15 and 16 are assuming. If the forward ends of the ground-engaging members 15 and 16 are moved down fairly close to the ground in order that the diggers 180 may operate, then of course suitable adjustment of the forward ends of shaft 73 will have to be made. As soon as these initial adjustments have been made the picking units are driven through motor 12 and the picker 10 moved along a row of beanstalks. The forward fingers 88 will first engage the upper portions of the beanstalks as shown in Fig. 4, and will strip the pods as well as the leaves from the stalks and as the picker progresses the stalk will be progressively stripped from top to bottom by succeeding fingers. During this operation pods will fall in between the space between ground-engaging members 15 and 16 although a majority of the pods and beans will be deposited on the conveyors 113. However, a certain percentage of the pods will fall to the ground, and it is a main object of the present invention to collect these pods in order to provide a more efficient picking machine.

By comparing Figs. 4, 5, and 6 it can be seen that the rear portions of ground-engaging members 15 and 16 will dig into the earth providing a mound about the pods which have fallen between the ground-engaging members and this mound is formed into a peaked shape as shown in Fig. 6 by the rotating fingers 88a and during this forming operation the pods which have fallen on the soil between the ground-engaging members will be hit by the rotating fingers 88a and thrown upwardly and will be eventually knocked into conveyors 113. Of course, during the initial stages of the operation of the picker a number of the pods will be knocked onto the upper surface of the opposing ground-engaging member but as soon as this space is filled up then the pods will be knocked upwardly by the fingers 88a. As can be seen in Fig. 6, when the rear fingers have passed over the beanstalks the beanstalks will have been completely stripped of their leaves and pods but substantially all the stalks will remain in the ground. Converging shields or guards 196 may be provided at the forward portion of the picker, see Fig. 2, for aiding the snouts 36 in funnelling the beanstalks in toward the fingers 88.

It will be observed from Fig. 2 that the path of travel of the opposed fingers overlap or are interjacent with respect to one another, and this construction can be called interengaging teeth. With these interengaging teeth the operation of which is best shown in Figs. 4, 5, and 6, a complete and thorough stripping of the vines is assured.

A modified form of the invention is disclosed in Figs. 8 and 9, and the modified form of the invention includes the wheeled vehicle 11 and most of the apparatus including the same construction of the fingers 88 and 88a, the shafts 64 and 73, sleeves 87 and 87a and the like as shown in Figs. 1 to 7, inclusive, but the indicating reference characters are followed by a suffix "a," "b" or "c." In the modified form of the invention there is, however, a center ground-engaging member 200 and side ground-engaging members 201 and 202 so that two longitudinal slots are provided by the ground-engaging members in this form of the invention instead of merely one.

Fig. 9 corresponds to Fig. 5 of the drawings for the first modification and the dotted lines in Fig. 9 show the positions of the ground-engaging members 200, 201, and 202 in which the modified form of the invention is in a position similar to the position of the first form of the invention shown in Fig. 6. In a modified form of the invention there is only one set of rotating fingers for each row of beans and there are curved shields 209 for each of the units for each of the rows of stalks shown in Fig. 9, the curved guards or shields being provided with a top cover portion 211 to confine the pods and leaves which are knocked off the stalks into the conveyor zone. There is a conveyor 113a very similar to the conveyor for the first form of the invention, the only difference being that it is centrally located between two rotating picking units instead of being located at the side of one unit. The modified form of the invention can be provided with either one rotating picking unit or it can be provided with two rotating picking units and a single conveyor.

The conveyor 113a is inclined upwardly at the rear as shown in Fig. 9 in a manner similar to the inclination of the conveyor 113 for the first form of the invention. The curved guards or shields 209 are in three parts as shown in Fig. 8, there being a rear part 216, a center removable and replaceable part 217, and a forward part 218. There are rear covers 224 provided on the modified form of the invention and the rear covers are relieved at 226, see Fig. 9, to allow the stripped stalks to escape the rear end of the picker. The stalks, of course, will be bent downwardly by the rear cover 224 but substantially all the stalks will remain in the ground. There is no forward or front cover but there are suitable guards or shields 230 in order to funnel the beanstalks into the spaces between the ground-engaging members 201, 200, and 202. There are shields 105b and 105c for the rotating finger units similar to shields 105 and 105a in the first form of the invention.

The operation of the modified form of the invention is similar to the operation of the first form of the invention. The ground-engaging members 201, 202, and 200 have the forward portions supported in a manner similar to the ground-engaging members of the first portion and have the rear portions dragging along the ground in order to form a mound. The beanstalks are funnelled into the slots provided by the ground-engaging members and are stripped by the rotating fingers 88b. As they are stripped from the stalks some of the pods will fall onto the ground between the ground-engaging members and as the rear portions of the ground-engaging members slide over a portion of the ground they will bear downwardly into the ground and form a mound which the fingers 88c will form into the dotted shape shown in Fig. 9, and in this position all the pods that have been deposited on the ground will be picked up by fingers 88c and knocked onto the conveyor 113a.

By use of the present invention a larger percentage of bean pods can be collected from beanstalks than was heretofore possible because of the improved means of stripping the beans, and also because of the fact that there are means for sweeping the soil between the ground-engaging members so that the bean pods that are deposited on the ground between the ground-engaging members will be picked up. With this system a very high percentage of the pods can be collected and hardly any of the pods are broken by the picking apparatus since the fingers 88b merely move up under the hook on the bean pods and knock the pods loose. In doing so, the leaves will also be stripped but the pods and leaves will be separate and it is a relatively simple matter to thereafter separate the leaves from the pods since the pods are heavier. By the present system and method substantially all the stalks themselves are left in the ground and therefore, the expense of transporting the stalks to a separating station is eliminated. Since the ground-engaging members are positioned as close as possible to the stalks a minimum amount of dirt will be picked up by the fingers 88c. Of course, the ground-engaging members will have to be spaced apart a distance such that a driver can drive the bean picker down the rows and still be able to straddle the beanstalks without having the ground-engaging members running into the beanstalks.

Various changes may be made in the details of construction without departing from the spirit and scope of the invention as defined by the appended claims, wherein I claim:

1. A bean picker comprising a frame, a pair of ground-engaging members on the frame and arranged to straddle a row of bean stalks and be moved therealong to define a limited ground area therebetween on which pods being picked may fall, means on the frame located above the ground-engaging members and between the ends of the ground-engaging members for stripping pods from the stalks whereby pods falling toward the ground fall on the ground-engaging members and the ground area between the ground-engaging members, means located on the members and rearwardly of the last-named means for sweeping the ground area between the ground-engaging members to thereby pick up pods which have fallen on the area, and means on the frame for collecting the pods deposited there by said first and second means.

2. A bean picker comprising a frame, a pair of ground-engaging members on the frame and arranged to straddle a row of bean stalks and be moved therealong to define a limited ground area therebetween on which pods being picked may fall, means on the frame located above the ground-engaging members and between the ends of the ground-engaging members for stripping pods from the stalks whereby pods falling toward the ground fall on the ground-engaging members and the ground area between the ground-engaging members, means located on the members and rearwardly of the last-named means for sweeping the entire ground area between the ground-engaging members to thereby pick up pods which have fallen on the ground area, and means on the frame for collecting the pods deposited there by said first and second means.

3. A bean picker comprising a frame, a pair of ground-engaging members on the frame and arranged to straddle a row of bean stalks and be moved therealong to define a limited ground area therebetween on which pods being picked may fall, means on the frame located above the ground-engaging members and between the ends of the ground-engaging members for stripping pods from the stalks whereby pods falling toward the ground fall on the ground-engaging members and the ground area between the ground-engaging members, means located on the members and rearwardly of the last-named means and inwardly of the rear ends of the ground-engaging members for sweeping the ground area between the ground-engaging members to thereby pick up pods which have fallen on the area, and means on the frame for collecting the pods deposited there by said first and second means.

4. A bean picker comprising a frame, a pair of ground-engaging members on the frame and arranged to straddle a row of bean stalks and be moved therealong to define a limited ground area therebetween on which pods being picked may fall, means on the frame located above the ground-engaging members and between the ends of the ground-engaging members for stripping pods from the stalks whereby pods falling toward the ground fall on the ground-engaging members and the ground area between the ground-engaging members, means located on the frame rearwardly of the last-named means for simultaneously sweeping the ground area between the ground-engaging members and forming the ground area into a predetermined shape to enable said means to pick up pods which have fallen on the ground area, and means on the frame for collecting the pods deposited there by said first and second means.

5. A bean picker comprising a frame, a pair of spaced elongated parallel ground-engaging members on the frame arranged to straddle a row of bean stalks and define a limited area of ground therebetween on which falling pods can fall, a pair of spaced parallel rotary toothed members mounted on the frame and having the teeth thereof arranged in staggered relationship with respect to one another and traversing overlapping paths, said toothed members being located above and parallel to the ground-engaging members and between the ends of the ground-engaging members and adapted to engage bean stalks and strip pods therefrom whereby falling pods fall on the ground-engaging members or the ground area between the ground-engaging members, means located on the members and rearwardly of the toothed members for sweeping the ground area between the ground-engaging members to thereby pick up pods which have fallen thereon, and means on the frame for collecting the pods deposited there by said members and said means.

6. A bean picker comprising a frame, a pair of spaced elongated parallel ground-engaging members on the frame arranged to straddle a row of bean stalks and define a limited area of ground therebetween on which falling pods can fall, a pair of spaced parallel rotary toothed members mounted on the frame and having the teeth thereof arranged in staggered relationship with respect to one another and traversing overlapping paths, said toothed members being located above and parallel to the ground-engaging members and between the ends of the ground-engaging members and adapted to engage bean stalks and strip pods therefrom whereby falling pods fall on the ground-engaging members or the ground area between the ground-engaging members, elongated means mounted on the frame and arranged longitudinally of the ground-engaging members and located rearwardly of the toothed members for simultaneously sweeping the ground area between the ground-engaging members and forming the ground area into a pattern to enable the rearward portion of the means to completely sweep the entire area between the ground-engaging members to thereby pick up pods which have fallen on the ground area between the ground-engaging members, and means on the frame for collecting the pods.

7. A bean picker comprising a frame, a pair of ground-engaging members on the frame arranged to straddle a row of bean stalks and be moved therealong and define a limited ground area therebetween on which pods being picked may fall, and means on the frame overlying the ground-engaging members for stripping pods from the stalks whereby pods falling toward the ground fall on the ground-engaging members and the ground area between the ground-engaging members, said last-named means including counter-rotating toothed units, and shields between the teeth having edges by which the teeth pass closely whereby portions of the stalks or the like torn from the stalks will be severed by coaction of the edges of the shields and the teeth to avoid clogging of the parts by the stalk portions.

8. A bean picker comprising a frame, a pair of ground-engaging members arranged to straddle a row of bean stalks and be moved therealong and define a limited ground area therebetween on which pods being picked may fall, means on the frame overlying the ground-engaging members for stripping pods from the stalks whereby pods falling toward the ground fall on the ground-engaging members and the ground area between the ground-engaging members, said last-named means including counter-rotating toothed units, shields between the teeth having edges by which the teeth pass closely whereby portions of the stalks or the like torn from the stalks will be severed by coaction of the edges of the shields and the teeth to avoid clogging of the parts by the stalk portions, means located on the members and rearwardly of the stripping means for sweeping the ground area between the ground-engaging members to thereby pick up pods which have fallen upon the ground area, and means in the frame for collecting the pods.

9. A bean picker comprising a frame, a pair of ground-engaging members on the frame arranged to staddle a row of bean stalks and be moved therealong and define a limited ground area therebetween on which pods being picked may fall, means on the under side of the ground-engaging members for forming a centrally disposed mound between the ground-engaging members, means on the frame located above the ground-engaging members and between the ends of the ground-engaging members for stripping pods from the stalks whereby pods falling toward the ground fall on the ground-engaging members and the ground area between the ground-engaging members, means located on the members and rearwardly of the last-named means for sweeping the ground area between the ground-engaging members to thereby pick up pods which have fallen on the ground area, and means on the frame for collecting the pods.

10. A bean picker comprising a frame, means on the frame for stripping pods from stalks, means on the frame enclosing the last-named means and receiving pods from the stripping means and having parallel opposed spaced edges below the stripping means straddling a row of stalks and defining a limited ground area on which falling pods may fall, means mounted on and within the last-named means for sweeping the ground area defined by said edges, and means on the frame for collecting the pods.

11. A bean picker comprising a frame, means on the frame for stripping pods from stalks, means on the frame enclosing the last-named means and receiving pods from the stripping means and having parallel opposed spaced edges below the stripping means straddling a row of stalks and defining a limited ground area on which falling pods may fall, means on the frame for collecting the pods and means mounted on and within the enclosing means and disposed rearwardly of the stripping means for sweeping the ground area defined by said edges.

12. A bean picker comprising a frame, a pair of ground-engaging members on the frame and arranged to straddle a row of bean stalks and be moved therealong to define a limited ground area therebetween on which pods being picked may fall, means on the frame and located above the ground-engaging members and between the ends of the ground-engaging members for stripping pods from the stalks whereby pods falling toward the ground fall on the ground-engaging members and the ground area between the ground-engaging members, said last-named means including counter-rotating toothed units, and shields between the teeth having edges by which the teeth pass closely whereby portions of the stalks torn from the stalks will be severed by coaction of the edges of the shields and the teeth thereby avoiding clogging of the parts by the stalk portions, means located on the members and rearwardly of the stripping means for sweeping the ground area between the ground-engaging members to thereby pick up pods which have fallen on the ground area, and means on the frame for collecting the pods.

13. A bean picker comprising a frame, a pair of ground-engaging members on the frame and arranged to straddle a row of bean stalks and be moved therealong to define a limited ground area therebetween on which pods being picked may fall, means located on the frame above the ground-engaging members and between the ends of the ground-engaging members for stripping pods from the stalks whereby pods falling toward the ground fall on the ground-engaging members and the ground area between the ground-engaging members, said last-named means including counter-rotating toothed units, shields between the teeth having edges by which the teeth pass closely whereby portions of the stalks or the like torn from the stalks will be severed by coaction of the edges of the shields and the teeth thereby avoiding clogging of the parts of the machine by the stalk portions, means located on the members and rearwardly of the stripping means and inwardly of the rear ends of the ground-engaging members for sweeping the ground area between the ground-engaging members to thereby pick up pods which have fallen on the area, and means on the frame for collecting the pods.

14. A bean picker comprising a frame, a pair of ground-engaging members on the frame and arranged to straddle a row of bean stalks and be moved therealong to define a limited ground area therebetween on which pods being picked may fall, means located on the frame above the ground-engaging members and between the ends of the ground-engaging members for stripping pods from the stalks whereby pods falling toward the ground fall on the ground-engaging members and the ground area between the ground-engaging members, means located on the members and rearwardly of the last-named means for sweeping the ground area between the ground-engaging members to thereby pick up pods which have fallen on the area, the sweeping means including counter-rotating toothed units, and means on the frame for collecting the pods.

15. A bean picker comprising a frame, a pair of ground-engaging members on the frame and arranged to straddle a row of bean stalks and be moved therealong to define a limited ground area therebetween on which pods being picked may fall, means located on the frame above the ground-engaging members and between the ends of the ground-engaging members for stripping pods from the stalks whereby pods falling toward the ground fall on the ground-engaging members and the ground area between the ground-engaging members, said stripping means including upwardly inclined parallel counter-rotating toothed units, and means located on the members and rearwardly of the stripping means for sweeping the ground area between the ground-engaging members to thereby pick up pods which have fallen on the ground area, the sweeping means comprising parallel counter-rotating toothed units, and means for driving the counter-rotating units, and means on the frame for collecting the pods.

16. A bean picker comprising a frame, a pair of ground-engaging members on the frame and arranged to straddle a row of bean stalks and be moved therealong to define a limited ground area therebetween on which pods being picked may fall, means located on the frame above the ground-engaging members and between the ends of the ground-engaging members for stripping pods from the stalks whereby pods falling toward the ground fall on the ground-engaging members and the ground area between the ground-engaging members, the stripping means including upwardly inclined parallel counter-rotating toothed units, means located on the members and rearwardly of the stripping means for sweeping the ground area between the ground-engaging members to thereby pick up pods which have fallen on the area, the sweeping means comprising parallel horizontally arranged counter-rotating toothed units connected in tandem with the first-named units, means for driving the counter-rotating units, and means on the frame for collecting the pods.

TOBIAS GRETHER.

References Cited in the file of this patent

UNITED STATES PATENTS

| Number | Name | Date |
|---|---|---|
| 1,105,235 | Appleby | July 28, 1914 |
| 1,859,980 | Mueller | May 24, 1932 |
| 1,948,975 | Urschel | Feb. 27, 1934 |
| 2,179,584 | Bourg Sr. | Nov. 14, 1939 |
| 2,354,112 | Garst | July 18, 1944 |
| 2,587,553 | Ward | Feb. 26, 1952 |